(12) United States Patent
Feng et al.

(10) Patent No.: US 11,023,620 B2
(45) Date of Patent: Jun. 1, 2021

(54) CRYPTOGRAPHY CHIP WITH IDENTITY VERIFICATION

(71) Applicant: Advanced New Technologies Co., Ltd., George Town (KY)

(72) Inventors: Zhiyuan Feng, Hangzhou (CN); Yanpeng Li, Hangzhou (CN); Long Cheng, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/587,901

(22) Filed: Sep. 30, 2019

(65) Prior Publication Data

US 2020/0311315 A1 Oct. 1, 2020

Related U.S. Application Data

(63) Continuation of application No. PCT/CN2019/080393, filed on Mar. 29, 2019.

(51) Int. Cl.
*G06F 21/72* (2013.01)
*G06F 21/76* (2013.01)
(Continued)

(52) U.S. Cl.
CPC .............. *G06F 21/72* (2013.01); *G06F 21/30* (2013.01); *G06F 21/602* (2013.01); *G06F 21/76* (2013.01); *G06F 2221/2143* (2013.01)

(58) Field of Classification Search
CPC ........ G06F 21/72; G06F 21/602; G06F 21/76; G06F 21/30; G06F 2221/2143
See application file for complete search history.

(56) References Cited

U.S. PATENT DOCUMENTS

| 6,031,910 | A | * | 2/2000 | Deindl | G06Q 20/341 380/255 |
| 7,340,462 | B2 | * | 3/2008 | Bertrand | G06F 21/34 |

(Continued)

FOREIGN PATENT DOCUMENTS

| CN | 201126581 | 10/2008 |
| CN | 101436247 | 5/2009 |

(Continued)

OTHER PUBLICATIONS

PCT International Search Report and Written Opinion in International Application No. PCT/CN2019/080366, dated Jan. 3, 2020, 6 pages.

(Continued)

*Primary Examiner* — Christopher A Revak
(74) *Attorney, Agent, or Firm* — Fish & Richardson P.C.

(57) ABSTRACT

Disclosed herein are methods, systems, and apparatus, including computer programs encoded on computer storage media, for performing cryptographic operations subject to identity verification. One of the methods includes receiving, by a cryptography chip, a request to perform a requested cryptographic operation from a client including client identity information, wherein the cryptography chip includes a processing resource that performs cryptographic operations and a storage resource that stores key information used in the cryptographic operations, and identity information associated with clients that are permitted to request cryptographic operations; determining, by the cryptography chip, that the client identity information is associated with one of the clients that are permitted to request cryptographic operations; and performing, by the cryptography chip, the requested cryptographic operation based on the key information stored in the storage resource.

30 Claims, 6 Drawing Sheets

(51) Int. Cl.
*G06F 21/60* (2013.01)
*G06F 21/30* (2013.01)

(56) References Cited

U.S. PATENT DOCUMENTS

| | | | |
|---|---|---|---|
| 7,707,225 B2* | 4/2010 | Akashika | G06Q 20/327 |
| | | | 380/277 |
| 8,775,757 B2 | 7/2014 | Polzin et al. | |
| 8,832,465 B2 | 9/2014 | Gulati et al. | |
| 9,559,737 B2* | 1/2017 | Shriya | H04L 63/0861 |
| 10,079,677 B2 | 9/2018 | Benson et al. | |
| 10,116,440 B1 | 10/2018 | Rudzitis et al. | |
| 10,536,271 B1 | 1/2020 | Mensch et al. | |
| 2005/0027991 A1* | 2/2005 | DiFonzo | G06F 21/10 |
| | | | 713/185 |
| 2005/0044375 A1 | 2/2005 | Paatero et al. | |
| 2006/0059372 A1* | 3/2006 | Fayar | G06F 21/72 |
| | | | 713/192 |
| 2006/0078109 A1* | 4/2006 | Akashika | G06F 21/602 |
| | | | 380/30 |
| 2006/0149962 A1 | 7/2006 | Fountain et al. | |
| 2006/0259782 A1 | 11/2006 | Wang et al. | |
| 2008/0178009 A1 | 7/2008 | Funahashi | |
| 2008/0192937 A1 | 8/2008 | Challener | |
| 2008/0215890 A1 | 9/2008 | Buer | |
| 2009/0065591 A1* | 3/2009 | Paul | G06F 21/77 |
| | | | 235/492 |
| 2009/0235068 A1 | 9/2009 | Song et al. | |
| 2009/0282260 A1 | 11/2009 | Tattan et al. | |
| 2010/0161992 A1 | 6/2010 | Schuetze et al. | |
| 2011/0126024 A1 | 5/2011 | Beatson et al. | |
| 2011/0302420 A1 | 12/2011 | Davida | |
| 2012/0131350 A1 | 5/2012 | Atherton | |
| 2012/0303966 A1 | 11/2012 | Hubner | |
| 2013/0061044 A1 | 3/2013 | Pinkus et al. | |
| 2013/0147603 A1 | 6/2013 | Malhas et al. | |
| 2013/0276074 A1 | 10/2013 | Orsini et al. | |
| 2013/0305055 A1 | 11/2013 | Atherton | |
| 2013/0308838 A1 | 11/2013 | Westernman et al. | |
| 2014/0089617 A1 | 3/2014 | Polzin et al. | |
| 2014/0089682 A1 | 3/2014 | Gulati et al. | |
| 2014/0108786 A1* | 4/2014 | Kreft | G06F 21/71 |
| | | | 713/156 |
| 2014/0122508 A1 | 5/2014 | Eigner et al. | |
| 2014/0237256 A1 | 8/2014 | Ben Ayed | |
| 2014/0267476 A1* | 9/2014 | Simpson | H04L 9/3271 |
| | | | 347/5 |
| 2015/0006914 A1* | 1/2015 | Oshida | G06F 21/72 |
| | | | 713/193 |
| 2015/0046707 A1 | 2/2015 | Atherton | |
| 2015/0095999 A1 | 4/2015 | Toth | |
| 2015/0242607 A1 | 8/2015 | Morris et al. | |
| 2015/0270962 A1* | 9/2015 | Hautier | G06F 21/76 |
| | | | 380/28 |
| 2015/0295908 A1 | 10/2015 | O'Hare et al. | |
| 2015/0303964 A1 | 10/2015 | Shriya et al. | |
| 2016/0072801 A1 | 3/2016 | Cao et al. | |
| 2016/0224776 A1 | 8/2016 | Leow | |
| 2016/0275461 A1 | 9/2016 | Sprague et al. | |
| 2016/0349999 A1 | 12/2016 | Adler et al. | |
| 2016/0359965 A1 | 12/2016 | Murphy et al. | |
| 2016/0365983 A1 | 12/2016 | Shahabuddin et al. | |
| 2017/0118018 A1 | 4/2017 | Dekker et al. | |
| 2017/0134348 A1 | 5/2017 | Roth et al. | |
| 2017/0213211 A1 | 7/2017 | Sibert et al. | |
| 2017/0270509 A1 | 9/2017 | Colegate et al. | |
| 2017/0357967 A1 | 12/2017 | Sykora et al. | |
| 2017/0373843 A1 | 12/2017 | Benson et al. | |
| 2017/0373844 A1 | 12/2017 | Sykora et al. | |
| 2018/0173871 A1 | 6/2018 | Toth | |
| 2018/0181739 A1 | 6/2018 | Zhong et al. | |
| 2018/0287792 A1 | 10/2018 | Fu | |
| 2018/0293387 A1 | 10/2018 | Bar-El et al. | |
| 2018/0309581 A1 | 10/2018 | Butler et al. | |
| 2018/0367311 A1 | 12/2018 | Stahlberg et al. | |
| 2019/0019144 A1 | 1/2019 | Gillen | |
| 2019/0026724 A1* | 1/2019 | Wade | H04L 9/0866 |
| 2019/0028283 A1* | 1/2019 | Sharifi | G06F 21/75 |
| 2019/0028284 A1* | 1/2019 | Rezayee | H04L 9/3278 |
| 2019/0095671 A1 | 3/2019 | Yeke Yazdandoost et al. | |
| 2019/0116049 A1* | 4/2019 | Ittogi | H04L 9/14 |
| 2019/0305949 A1 | 10/2019 | Hamel et al. | |
| 2019/0305952 A1 | 10/2019 | Hamel et al. | |
| 2020/0004967 A1* | 1/2020 | Fu | H04L 9/3268 |

FOREIGN PATENT DOCUMENTS

| | | |
|---|---|---|
| CN | 101467430 | 6/2009 |
| CN | 101764694 | 6/2010 |
| CN | 102594843 | 7/2012 |
| CN | 103138927 | 6/2013 |
| CN | 104239815 | 12/2014 |
| CN | 105975839 | 9/2016 |
| CN | 106301767 | 1/2017 |
| CN | 107241317 | 10/2017 |
| CN | 104580107 | 2/2018 |
| CN | 108540457 | 9/2018 |
| CN | 108881000 | 11/2018 |
| CN | 108900296 | 11/2018 |
| CN | 109150535 | 1/2019 |
| CN | 109525392 | 3/2019 |
| EP | 1175749 | 1/2002 |
| EP | 1370022 | 12/2003 |
| JP | 10247906 | 9/1998 |
| JP | 2001319164 | 11/2001 |
| JP | 2003337875 | 11/2002 |
| JP | 2003110552 | 4/2003 |
| JP | 2004104539 | 4/2004 |
| JP | 2006079181 | 3/2006 |
| JP | 2006079191 | 3/2006 |
| JP | 2006221566 | 8/2006 |
| JP | 2006295916 | 10/2006 |
| JP | 2006350429 | 12/2006 |
| JP | 2007018301 | 1/2007 |
| JP | 2008198186 | 8/2008 |
| JP | 2018124959 | 8/2018 |
| TW | 200949603 | 12/2009 |
| TW | 201328280 | 7/2013 |
| TW | 201741922 | 12/2017 |
| TW | 201901551 | 1/2019 |
| WO | WO 2004014017 | 2/2004 |
| WO | WO 2018166356 | 9/2018 |

OTHER PUBLICATIONS

PCT International Search Report and Written Opinion in International Application No. PCT/CN2019/080372, dated Dec. 27, 2019, 6 pages.
PCT International Search Report and Written Opinion in International Application No. PCT/CN2019/080384, dated Dec. 27, 2019, 7 pages.
PCT International Search Report and Written Opinion in International Application No. PCT/CN2019/080393, dated Dec. 27, 2019, 8 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
European Extended Search Report in European Patent Application No. 19732215.9, dated Mar. 25, 2020, 7 pages.
European Extended Search Report in European Patent Application No. 19732240.7, dated May 15, 2020, 9 pages.
U.S. Appl. No. 16/588,106, filed Sep. 30, 2019, Zhiyuan Feng.
U.S. Appl. No. 16/587,978, filed Sep. 30, 2019, Zhiyuan Feng.
U.S. Appl. No. 16/587,593, filed Sep. 30, 2019, Zhiyuan Feng.
European Extended Search Report in European Patent Application No. 19732220.9, dated Jun. 16, 2020, 6 pages.

(56) References Cited

OTHER PUBLICATIONS

Extended European Search Report in European Application No. 19732221.7, dated Sep. 8, 2020, 11 pages.

* cited by examiner

CRYPTOGRAPHY CHIP WITH IDENTITY VERIFICATION

CROSS-REFERENCE TO RELATED APPLICATIONS

This application is a continuation of PCT Application No. PCT/CN2019/080393, filed on Mar. 29, 2019, which is hereby incorporated by reference in its entirety.

TECHNICAL FIELD

This specification relates to performing cryptographic operations subject to identity verification.

BACKGROUND

In some computing applications, cryptography is used to transform data into a form that is unreasonably difficult to decipher to obtain the original value of the data without possessing an associated cryptographic key. Loss of a cryptographic key can render all data encrypted with the key unrecoverable. In addition, if a cryptographic key is learned by an unauthorized party, all data encrypted with the key is no longer secure as it can be read by the unauthorized party. It would be desirable to protect cryptographic keys from being lost or compromised to reduce the risk of associated economic loss that would be incurred by the owners of the keys.

SUMMARY

This specification describes technologies for performing cryptographic operations subject to identity verification. These technologies generally involve, for example, verifying identity information for client requesting a cryptographic operation against stored identity information, and performing the requested cryptographic operation if the verification succeeds. If the verification is unsuccessful, the requested cryptographic operation is not performed and/or rejected.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
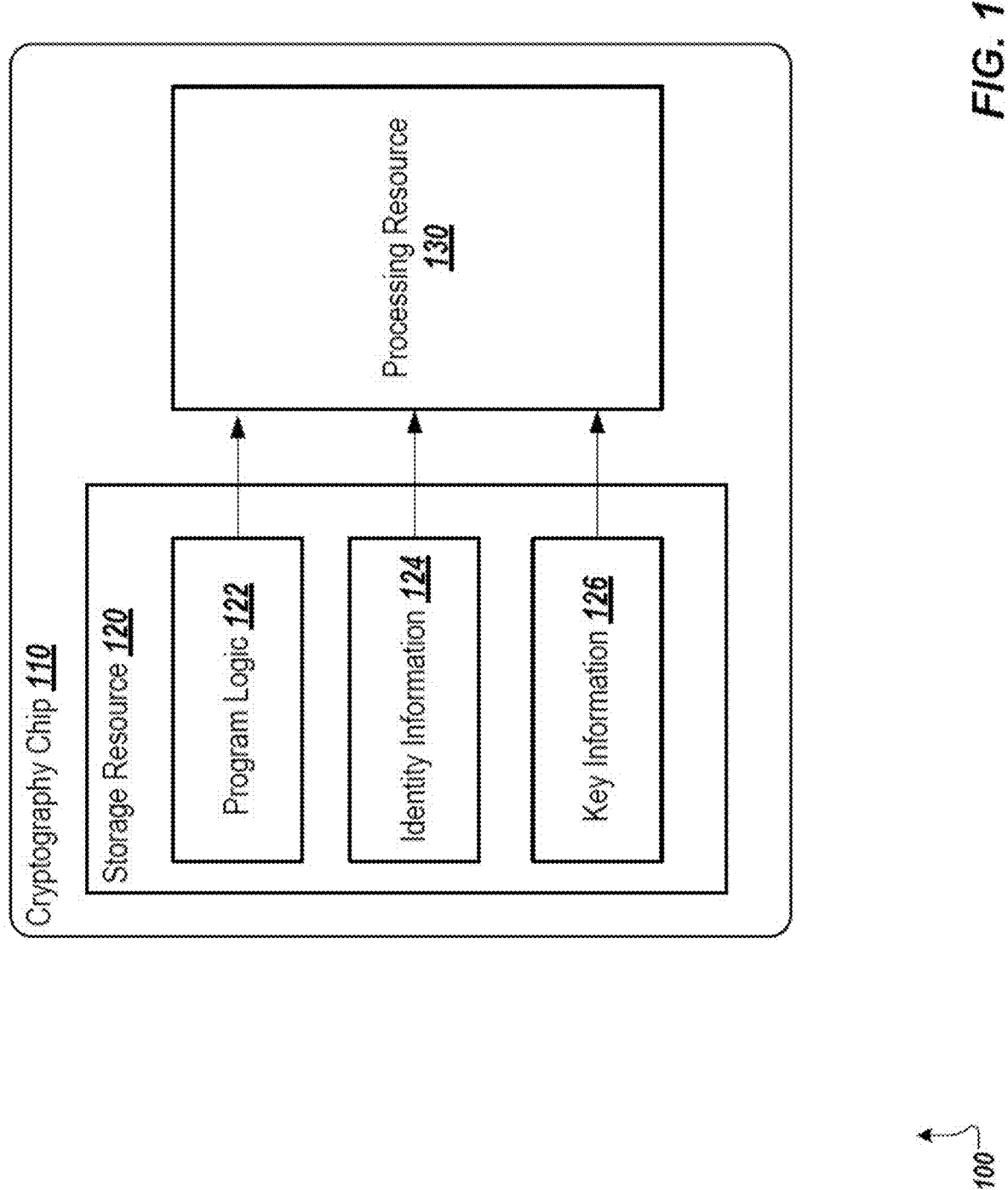
FIG. 1 is a diagram illustrating an example of an environment that can be used to execute embodiments of this specification.

This specification describes techniques for performing cryptographic operations using a cryptography chip. Cryptography is used in some computing applications to transform data into a form that is unreasonably difficult to decipher to obtain the original value of the data without possessing an associated encryption key. For example, if two computing devices want to communicate sensitive data over a public network allowing all parties on the network access to the data, the sending computing device can encrypt the data into a ciphertext prior to sending, and the receiving computing device can decrypt the ciphertext to recover the original value of the data. Examples of cryptography include, without limitation, symmetric encryption, and asymmetric encryption.

Symmetric encryption refers to an encryption process that uses a single key for both encryption (generating ciphertext from plaintext), and decryption (generating plaintext from ciphertext). In symmetric encryption, the same key is distributed to all parties to a communication, so each party can encrypt and decrypt transaction data.

Asymmetric encryption uses keys pairs that each include a private key, and a public key, the private key being kept secret by a particular party, and the public key being able to be freely shared by the particular party with other parties. A party can use the public key of particular party to encrypt data, and the encrypted data can then be decrypted using the particular party's private key. Data encrypted with a party's public key can only be decrypted using that party's private key. In addition, the private key is not derivable from the public key, allowing the public key to be freely shared.

Asymmetric encryption is used to provide digital signatures, which enable a receiving party to confirm that received data originated from the expected sending party and has not been tampered with. Digital signatures can also be used to ensure that data has not been tampered with (i.e., its value has not changed). For example, a first party can digitally sign a set of data by first computing a hash of the data using a hash function, such as MD5, SHA-256, or another function. The first party then uses its private key to encrypt the hash and produce a digital signature. The second party can then use the first party's public key to decrypt the digital signature and recover the hash. The second party then computes a hash of the data associated with the digital signature using the same hash function. If this hash matches the recovered hash from the digital signature, the second party knows that the first party signed created the digital signature using its private key, as if the digital signature had been created using a different key it would not have produced the correct hash for the data when decrypted using the corresponding public key. In addition, the second party knows that the data has not been tampered with since it was signed by the first party, because a tampering party would be unable to modify the encrypted hash to make it match the new value of the data without knowing the private key.

This specification describes techniques for performing cryptographic operations using a cryptography chip that is configured to protect the keys used to perform the operations from being compromised or lost. In some embodiments, the cryptography chip includes an integrated storage resource that stores key information (e.g., one or more encryption keys) and identity information. The cryptography chip receives requests to perform cryptographic operations (e.g., encrypting data, decrypting data, producing/verifying digital signatures). The requests include identity information of the user requesting the operation. For each request, the cryptography chip verifies the identity of the requesting user based on comparing identity information from the request with the stored identity information. If the identity of the requesting user is verified (e.g., the received identity information matches the stored identity information), the cryptography chip performs the requested cryptographic operation. If the identity of the requesting user is not verified (e.g., the received identity information does not match the stored identity information), the cryptography chip does not perform the requested cryptographic operation. Although this specification provides examples where the identity of a user is verified, in each of the examples described herein, a client can also be verified. A client can be a user, a computing device, an organization, or other types of entities.

FIG. 1 is a diagram illustrating an example of an environment 100 that can be used to execute embodiments of this specification. As shown, the environment 100 includes a cryptography chip 110. The cryptography chip 110 includes a storage resource 120 storing program logic 122, identity information 124, and key information 126. The cryptography chip 110 also includes a processing resource 130.

The cryptography chip 110 is a computing component (e.g., an integrated circuit) that is configured to perform cryptographic operations. In some cases, the cryptography chip 110 can be an integrated circuit including the depicted components. The cryptography chip 110 can include a substrate composed of a semiconductor material (such as silicon) upon which the depicted components are attached. In some cases, the depicted components can be connected by areas of conductive material (e.g., wires or leads) to form electrical connections between the components. The cryptography chip 110 can also include connections (e.g., pins) allowing it to be installed in and interface with other computing systems.

The cryptography chip 110 includes a storage resource 120. In some cases, the storage resource 120 is an electronic storage device that allows for persistent storage of data (i.e., where stored data is not lost when the device is not powered). In some embodiments, the storage resource 120 can include a flash memory device, a programmable read-only memory (PROM) device, an electrically-erasable programmable read-only memory (EEPROM) device, or another type of storage device that stores data persistently and allows data to be erased and reprogrammed.

The cryptography chip 110 also includes a processing resource 130. In some cases, the processing resource 130 is a processor capable of executing software instructions, such as, for example, a field-programmable gate array (FPGA), an application specific integrated circuit (ASIC), a single-chip microcomputer, a microprocessor, or other type of processor.

As shown, program logic 122 is stored in the storage resource 120. In some cases, the program logic 122 includes software instructions to be executed by the processing resource 130. The program logic 122 can include instructions operable when executed to perform operations related to received requests to perform cryptographic operations, such as parsing the request to retrieve the data, verifying identity information in the request, and performing the requested cryptographic operations if the identity verification succeeds. In some cases, the program logic 122 can be stored unencrypted, as the instructions themselves may not include any sensitive information.

The storage resource 120 also includes identity information 124 representing the identities of users that are permitted to perform cryptographic operations using the cryptography chip 110. In some cases, requests to perform cryptographic operations that are sent to the cryptography chip 110 include user identity information. The cryptography chip 110 verifies the identity of the user requesting the cryptographic operations based on the identity information 124. If the cryptography chip 110 is able to verify the user's identity, the requested cryptographic operation is performed. If not, the requested cryptographic operation is not performed. This process is described in greater detail with respect to FIG. 2.

The storage resource 120 also includes key information 126 including one or more cryptographic keys used by the cryptography chip 110 to perform cryptographic operations. In some cases, the cryptographic keys can be symmetric keys, private keys of asymmetric key pairs, or other types of keys that are to be kept secret. In some embodiments, the key information 126 can be stored in an encrypted form so that the key information 126 cannot be read from the storage resource 120 without the appropriate key to decrypt the information. This process is described in greater detail with respect to FIG. 2.

Figure 2:
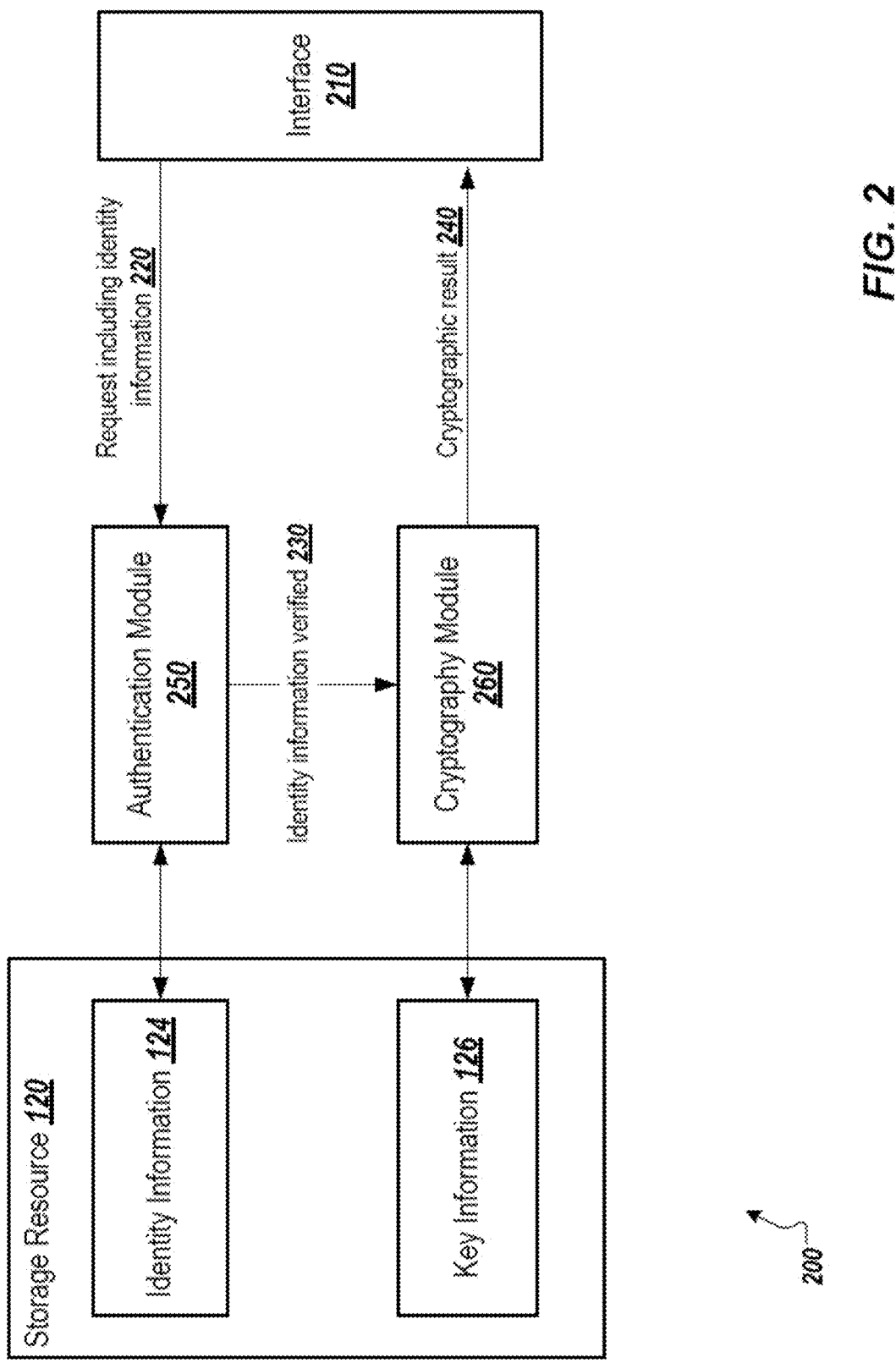
FIG. 2 is a diagram illustrating an example of a system that can be used to execute embodiments of this specification.

FIG. 2 is a diagram illustrating an example of a system 200 that can be used to execute embodiments of this specification. The system 200 depicts a portion of the cryptography chip 110 including the identity information 124 and the key information 126 stored in the storage resource 120 as described above relative to FIG. 1. The system 200 also includes an authentication module 250 and a cryptography module 260.

As shown, the system 200 includes an authentication module 250 operable to verify identity information included in received requests to perform cryptographic operations. In some cases, the authentication module 250 can be a software module defined in the program logic 122 executed by the processing resource 130. In some embodiments, the authentication module 250 can be an independent hardware component included in the cryptography chip 110, such as an additional processor or a processing core of the processing resource 130. The authentication module 250 can also be a logical or physical division of the processing resource 130 that is responsible for performing the authentication process.

As shown, the system 200 includes a cryptography module 260 operable to perform requested cryptographic operations. In some cases, the cryptography module 260 can be a software module defined in the program logic 122 executed by the processing resource 130. In some embodiments, the cryptography module 260 can be an independent hardware component included in the cryptography chip 110, such as an additional processor or a processing core of the processing resource 130. The cryptography module 260 can also be a logical or physical division of the processing resource 130 that is responsible for performing the authentication process.

The system 200 also includes an interface 210. The interface 210 provides a mechanism for external components or users to send and receive data to the components within the cryptography chip 110, such as the authentication module 250 and the cryptography module 260. In some implementations, the interface 210 is a physical interface between the cryptography chip 110 and a system in which it has been installed, such as a physical pin connection between the cryptography chip 110 and a larger integrated circuit, such as a motherboard. In some cases, the interface 210 is a software layer that provides an application programming interface (API) to programs executed by the processing resource 130 of the cryptography chip 110, or executed by another processor in a larger system in which the cryptography chip is installed.

In operation, at 220, the authentication module 250 receives requests to perform cryptographic operations from external components or programs via the interface 210. Each request includes identity information associated with a user associated with the request. In some cases, the received identity information includes a digital signature of the user requesting the cryptographic operations.

In some cases, the received identity information can include biometric or other identifying information associated with the user. For example, the cryptography chip 110 can include a fingerprint scanner or other biometric device to collect biometric information from the user. To request a cryptographic operation, the user touches the fingerprint scanner, which generates a digital representation of the user's fingerprint. In some cases, the user can select a desired cryptographic operation, such as through a keypad or other interface of the cryptography chip 110. A request for the desired cryptographic operation can be generated by the procession resource 130, and passed to the authentication module 250 via the interface 210.

The authentication module 250 verifies the received identity information based on the stored identity information 124. In cases where the identity information includes a digital signature of the user, the authentication module 250 can verify the signature by decrypting it with a public key associated with the user and comparing the decrypted data to an expected value (e.g., the hash verification described above). If the values match, the user's identity is verified. If the values do not match, the user's identity is not verified. In cases where the identity information is biometric information, the authentication module 250 compares the digital representation of the biometric data included in the request to stored biometric data included in the identity information 124. If the received biometric data matches the stored biometric data, the user's identity is verified. If the received biometric data does not match the stored biometric data, the user's identity is not verified.

In some cases, if the authentication module 250 verifies the user, the authentication module indicates to the cryptography module 260 that the identity information has been verified (at 230). In response to receiving this indication, the cryptography module 260 performs the requested cryptographic operation and returns a cryptographic result (240) to the requester via the interface 210. In some cases, if the authentication module 250 cannot verify the user, the cryptography module 260 does not perform the requested cryptographic operation. In some examples, a rejection is sent to the requester by the authentication module 250, the cryptography module 260, or another component.

The cryptographic operations performed by the cryptography module 150 can include, without limitation, encrypting data, decrypting data, producing a digital signature, verifying a digital signature, or other cryptographic operations. For example, the request to perform a cryptographic operation could indicate that a decryption operation is requested, and could include a ciphertext to be decrypted using an encryption key associated with the requesting user (e.g., a private key). In such a case, the cryptography module 150 could decrypt the ciphertext using the stored key information 126, and return a decrypted version of the ciphertext at 240 as the cryptographic result.

Figure 3:
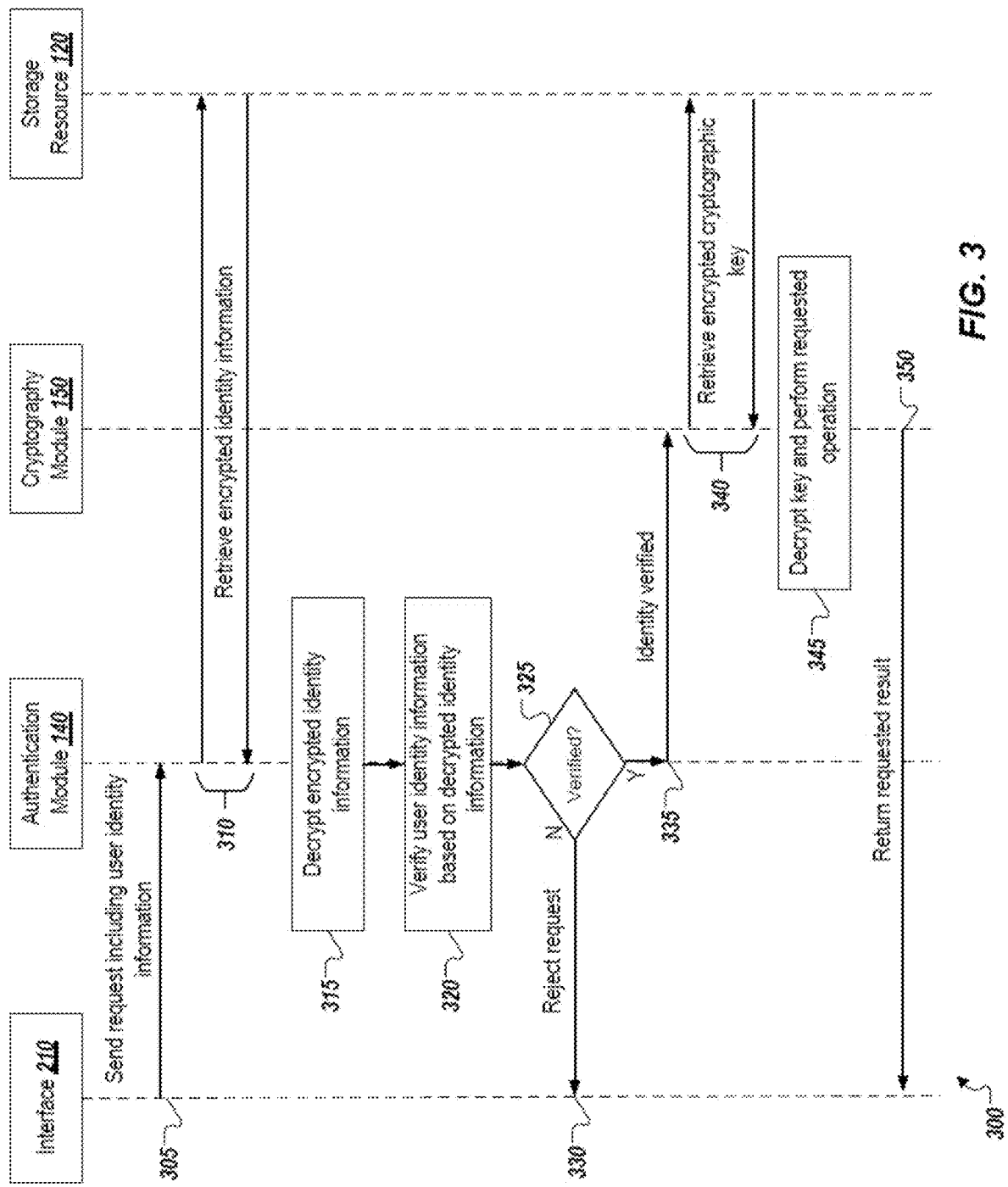
FIG. 3 is a diagram illustrating an interaction between components of the system shown in FIG. 2.

FIG. 3 is a diagram illustrating an interaction 300 between components of the system shown in FIG. 2. At 305, the interface 210 sends a request including user identity information to the authentication module 140, as previously discussed relative to FIG. 2. At 310, the authentication module 140 retrieves encrypted identity information (e.g., an encryption key for verifying a digital signature, biometric data, etc.) from the storage resource 120. At 315, the authentication module 140 decrypts the encrypted identity information retrieved from the storage resource 120. In some cases, the key used to decrypt the retrieved identity information is also retrieved from the storage resource 120. The key can also be included in the authentication module 140 itself, such as by being "hardcoded" into software instructions stored in a firmware of the authentication module 140 or the processing resource 130.

At 320, the authentication module 140 verifies the user identity information based on the decrypted identity information, as previously described relative to FIG. 2. At 325, execution of the authentication module 140 branches based on the result of the verification. If the user identity was not verified, the authentication module 140 returns a rejection of the request to the requester via the interface 210 (at 330). If the user identity was verified, the authentication module 140 sends an indication to the cryptography module 150 that the user identity was verified (at 335).

At 340, in response to receiving the indication, the cryptography module 150 retrieves an encrypted cryptographic key associated with the user from the storage resource 120. At 345, the cryptography module 150 decrypts the cryptographic key. In some cases, the key used to decrypt the retrieved identity information is also retrieved from the storage resource 120. The key can also be included in the cryptography module 150 itself, such as by being "hardcoded" into software instructions stored in a firmware of the cryptography module 150 or the processing resource 130.

Also at 345, the cryptography module 150 performs the requested cryptographic operation. At 350, the cryptography module returns a result of the cryptographic operation to the requester via the interface 210.

Figure 4:
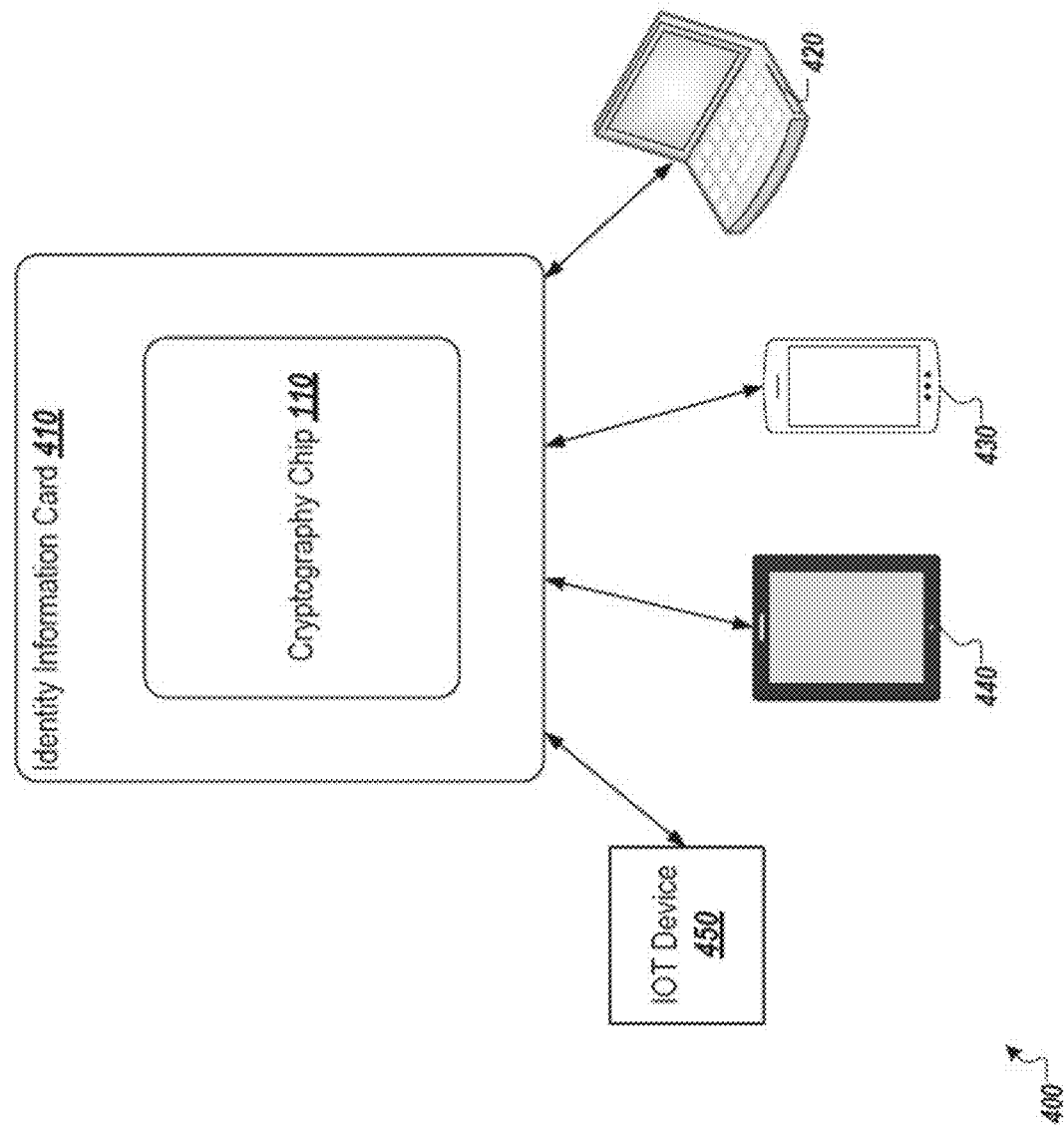
FIG. 4 is a diagram illustrating an example of an environment that can be used to execute embodiments of this specification

FIG. 4 is a diagram illustrating an example of an environment 400 that can be used to execute embodiments of this specification. As shown, the environment 400 includes an identity information card 410 including the cryptography chip 110. The identity information card 410 is communicatively coupled to a computer 420, a smartphone 430, a tablet device 440, and an internet of things (IOT) device 450.

In operation, the identity information card 410 communicates with the various devices 420, 430, 440, and 450. This communication can take place over a wired or wireless communications protocol, such as, for example, a near-field communications (NFC) protocol, BLUETOOTH, WIFI, a cellular protocol, an infrared communications protocol, or another type of protocol. In some cases, the communication involves encryption and/or decryption of data, such as, for example, using a secure communications protocol such as Transport Layer Security (TLS), providing a digital signature on data sent to the devices 420, 430, 440, 450, verifying a digital signature provided by one of the devices 420, 430, 440, 450, or using other mechanisms. As described above, these cryptographic operations would be performed by the cryptography chip 110 included in the identity information card 410 if the cryptography chip 110 can verify the identity of the requesting user.

In some cases, the identity information card 410 can be a portable device carried by the user, such as a smart card. In some cases, as described above, the identity information card can include a biometric sensor, and the user can provide identity information by interacting with the biometric sensor. In some cases, the identity information card 410 can be inserted into a compatible device and provided with power from the device to perform its operations. In such a case, data can be transferred between the identity information card 410 and the device through conductive contacts between the device and the identity information card 410.

Figure 5:
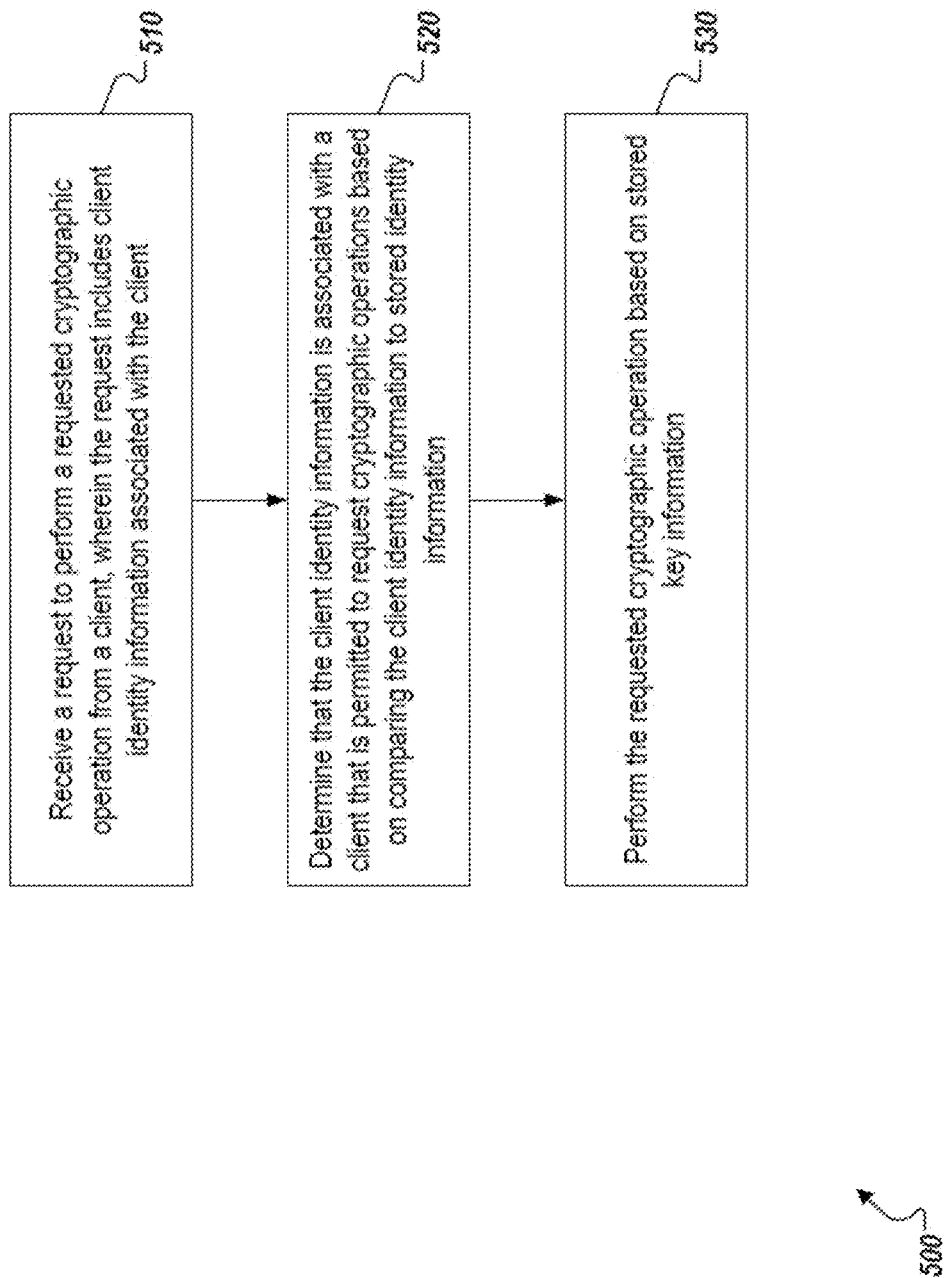
FIG. 5 depicts an example of a process that can be executed in accordance with embodiments of this specification.

FIG. 5 is a flowchart of an example of a process 500 for performing cryptographic operations subject to identity verification. For convenience, the process 500 will be described as being performed by a system of one or more computers, located in one or more locations, and programmed appropriately in accordance with this specification. For example, a cryptography chip, e.g., the cryptography chip 110 environment 100 of FIG. 1, appropriately programmed, can perform the process 500.

At 510, a request is received by a cryptography chip to perform a requested cryptographic operation from a client, wherein the request includes client identity information associated with the client, and wherein the cryptography chip is a hardware component including a processing resource that performs cryptographic operations and a storage resource that stores key information used in the cryptographic operations, and identity information associated with clients that are permitted to request cryptographic operations. In some cases, the requested cryptographic operation is an encryption operation, a decryption operation, a digital signature verification operation, or a digital signature generation operation. In some cases, the cryptography chip is a field-programmable gate array (FPGA), an application specific integrated circuit (ASIC), or a microprocessor.

At 520, it is determined that the client identity information is associated with one of the clients that are permitted to request cryptographic operations based on comparing the client identity information to the identity information stored in the storage resource.

At 530, in response to determining that the client identity information is associated with one of the clients that are permitted to request cryptographic operations, the requested cryptographic operation is performed based on the key information stored in the storage resource. In some cases, the request includes data, and the cryptography chip performs the requested cryptographic operation on the data. In some examples, the cryptography chip includes an operating system executed by the processing resource to operate a computer system in which the cryptography chip is included.

In some cases, the request is a first request, the requested cryptographic operation is a first requested cryptographic operation, the client identity information is first client identity information, and the process 500 includes receiving a second request to perform a second requested cryptographic operation from a second client, wherein the second request includes second client identity information associated with the second client; and determining that the second client identity information is not associated with one of the clients that are permitted to request cryptographic operations based on comparing the second client identity information to the identity information stored in the storage resource, wherein, in response to determining that the second client identity information is not associated with one of the clients that are permitted to request cryptographic operations, the cryptography chip does not perform the second requested cryptographic operation.

In some examples, the process 500 includes determining that one or more requests to perform cryptographic operations are malicious based on the requests not including client identity information associated with one of the clients that are permitted to request cryptographic operations; and in response to determining that the one or more requests to perform cryptographic operations are malicious, clearing the identity information and the key information from the storage resource. In some cases, the cryptography chip can determine that the requests are malicious based on multiple factors, including, without limitation, a frequency with which the requests that cannot be verified are received, a pattern associated with the client identities included in the request (e.g., indicating that an attacker is trying different identity values sequentially to attempt to find a valid identity), a number of unverified requests from a particular client in a particular amount of time, or other factors. Erasing the key information and the identity information from the storage resource is done to ensure that the attacker cannot access this information by any means.

In some embodiments, the cryptography chip is a field-programmable gate array (FPGA), and the process 500 includes receiving a request to reprogram the cryptography chip including reprogramming information; and in response to receiving the request, replacing information stored in the storage resource with the reprogramming information.

Figure 6:
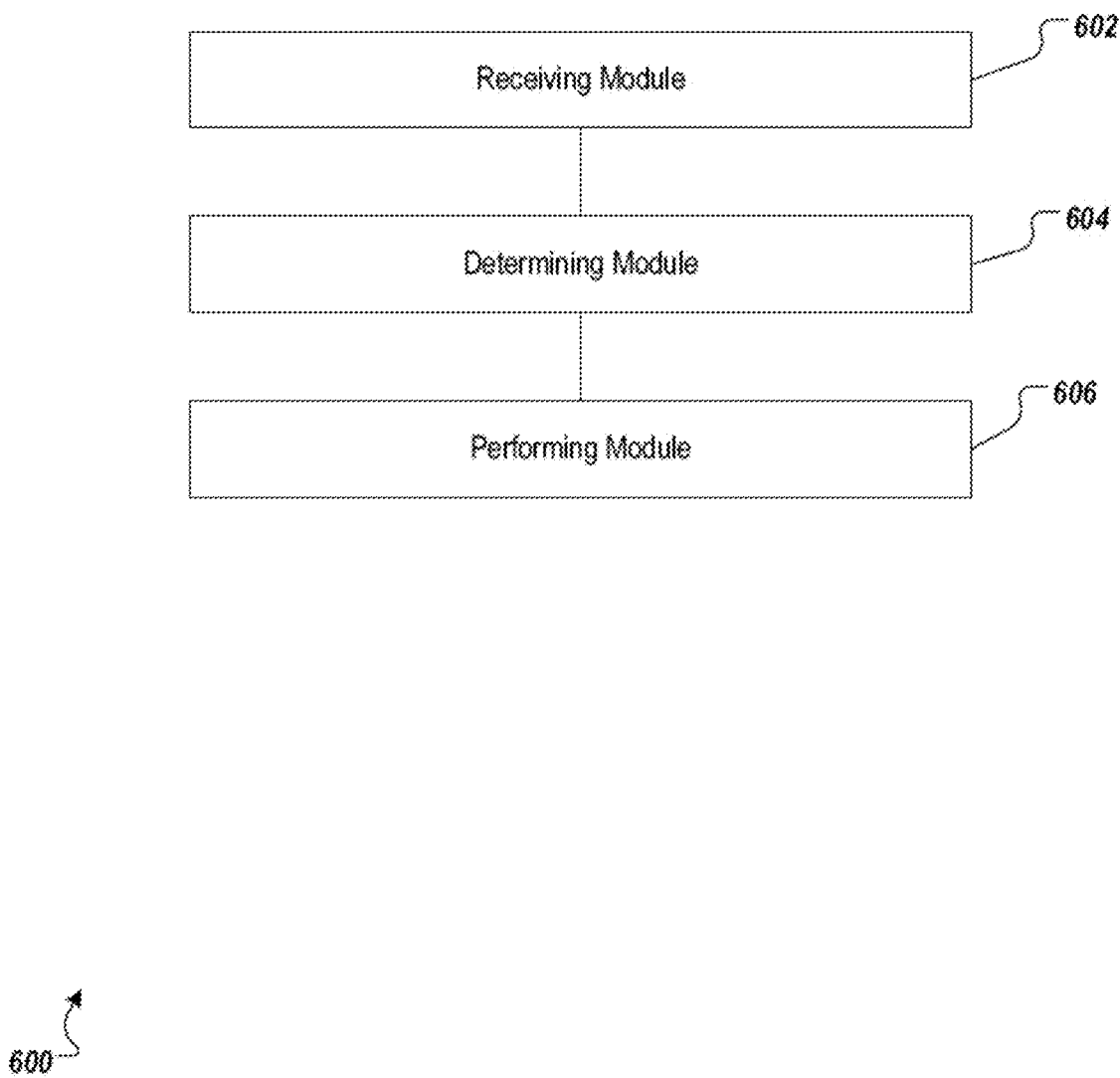
FIG. 6 depicts examples of modules of an apparatus in accordance with embodiments of this specification.

FIG. 6 is a diagram of on example of modules of an apparatus 600 in accordance with embodiments of this specification.

The apparatus 600 can be an example of an embodiment of a cryptography chip for performing cryptographic operations subject to identity verification. The apparatus 600 can correspond to the embodiments described above, and the apparatus 600 includes the following: a receiving module 602 for receiving, by a cryptography chip, a request to perform a requested cryptographic operation from a client, wherein the request includes client identity information associated with the client, and wherein the cryptography chip is a hardware component including a processing resource that performs cryptographic operations and a storage resource that stores key information used in the cryptographic operations, and identity information associated with clients that are permitted to request cryptographic operations; a determining module 604 for determining, by the cryptography chip, that the client identity information is associated with one of the clients that are permitted to request cryptographic operations based on comparing the client identity information to the identity information stored in the storage resource; and a performing module 606 for performing, by the cryptography chip, the requested cryptographic operation based on the key information stored in the storage resource in response to determining that the client identity information is associated with one of the clients that are permitted to request cryptographic operations.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 6, it can be interpreted as illustrating an internal functional module and a structure of a cryptography chip for performing cryptographic operations subject to identity verification. An execution body in essence can be an electronic device, and the electronic device includes the following: one or more processors; and a memory configured to store an executable instruction of the one or more processors.

The techniques described in this specification produce one or more technical effects. In some embodiments, the techniques provide increased security for clients by verifying the identity of a client (e.g., by verifying a digital signature) prior to performing a requested cryptographic operation using store cryptographic keys. This provides increased security because it prevents an attacker (whose identity will not be verified) from using the client's cryptographic keys to decrypt private data, to impersonate the client by forging the client's digital signature, or to perform other harmful actions. In some embodiments, the techniques provide for additional security by erasing stored cryptographic keys in response to the detection of malicious activity. This prevents an attacker from performing a "brute force" attack on the device by sending it a large number of identities trying to match the stored identity in order to access the cryptographic functions of the device.

Described embodiments of the subject matter can include one or more features, alone or in combination. For example, in a first embodiment, receiving, by a cryptography chip, a request to perform a requested cryptographic operation from a client, wherein the request includes client identity information associated with the client, and wherein the cryptography chip is a hardware component including a processing resource that performs cryptographic operations and a storage resource that stores key information used in the cryptographic operations, and identity information associated with clients that are permitted to request cryptographic operations; determining, by the cryptography chip, that the client identity information is associated with one of the clients that are permitted to request cryptographic operations based on comparing the client identity information to the identity information stored in the storage resource; and in response to determining that the client identity information is associated with one of the clients that are permitted to request cryptographic operations, performing, by the cryptography chip, the requested cryptographic operation based on the key information stored in the storage resource.

The foregoing and other described embodiments can each, optionally, include one or more of the following features:

A first feature, combinable with any of the following features, specifies that the requested cryptographic operation is an encryption operation, a decryption operation, a digital signature verification operation, or a digital signature generation operation.

A second feature, combinable with any of the previous or following features, specifies that the cryptography chip is a field-programmable gate array (FPGA), an application specific integrated circuit (ASIC), or a microprocessor.

A third feature, combinable with any of the previous or following features, specifies that the request includes data, and wherein the cryptography chip performs the requested cryptographic operation on the data.

A fourth feature, combinable with any of the previous or following features, specifies that the cryptography chip includes an operating system executed by the processing resource to operate a computer system in which the cryptography chip is included.

A fifth feature, combinable with any of the previous or following features, specifies that the request is a first request, the requested cryptographic operation is a first requested cryptographic operation, the client identity information is first client identity information, and that the method includes receiving, by the cryptography chip, a second request to perform a second requested cryptographic operation from a second client, wherein the second request includes second client identity information associated with the second client; and determining, by the cryptography chip, that the second client identity information is not associated with one of the clients that are permitted to request cryptographic operations based on comparing the second client identity information to the identity information stored in the storage resource, wherein, in response to determining that the second client identity information is not associated with one of the clients that are permitted to request cryptographic operations, the cryptography chip does not perform the second requested cryptographic operation.

A sixth feature, combinable with any of the previous or following features, specifies that the method includes determining, by the cryptography chip, that one or more requests to perform cryptographic operations are malicious based on the requests not including client identity information associated with one of the clients that are permitted to request cryptographic operations; and in response to determining that the one or more requests to perform cryptographic operations are malicious, clearing, by the cryptography chip, the identity information and the key information from the storage resource.

A seventh feature, combinable with any of the previous or following features, specifies that the cryptography chip is a field-programmable gate array (FPGA), and the method includes receiving, by the cryptography chip, a request to reprogram the cryptography chip including reprogramming information; and in response to receiving the request, replacing, by the cryptography chip, information stored in the storage resource with the reprogramming information.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for performing cryptographic operations subject to identity verification, the method comprising:
   receiving, by a cryptography chip, a request to perform a requested cryptographic operation from a client, wherein the request includes client identity information associated with the client, and wherein the cryptography chip is a hardware component including a processing resource that performs cryptographic operations and a storage resource that stores key information used in the cryptographic operations and encrypted identity information associated with clients that are permitted to request cryptographic operations;
   decrypting, by the cryptography chip, the encrypted identity information using a key included in software instructions stored in a firmware of the cryptography chip;
   determining, by the cryptography chip, that the client identity information is associated with one of the clients that are permitted to request cryptographic operations based on comparing the client identity information to the decrypted identity information; and
   in response to determining that the client identity information is associated with one of the clients that are permitted to request cryptographic operations, performing, by the cryptography chip, the requested cryptographic operation based on the key information stored in the storage resource.

2. The computer-implemented method of claim 1, wherein the requested cryptographic operation is an encryption operation, a decryption operation, a digital signature verification operation, or a digital signature generation operation.

3. The computer-implemented method of claim 1, wherein the cryptography chip is a field-programmable gate array (FPGA), an application specific integrated circuit (ASIC), or a microprocessor.

4. The computer-implemented method of claim 1, wherein the request includes data, and wherein the cryptography chip performs the requested cryptographic operation on the data.

5. The computer-implemented method of claim 1, wherein the cryptography chip includes an operating system executed by the processing resource to operate a computer system in which the cryptography chip is included.

6. The computer-implemented method of claim 1, wherein the request is a first request, the requested cryptographic operation is a first requested cryptographic operation, the client identity information is first client identity information, the method further comprising:
   receiving, by the cryptography chip, a second request to perform a second requested cryptographic operation from a second client, wherein the second request includes second client identity information associated with the second client; and
   determining, by the cryptography chip, that the second client identity information is not associated with one of the clients that are permitted to request cryptographic operations based on comparing the second client identity information to the decrypted identity information,
   wherein, in response to determining that the second client identity information is not associated with one of the clients that are permitted to request cryptographic operations, the cryptography chip does not perform the second requested cryptographic operation.

7. The computer-implemented method of claim 1, further comprising:
   determining, by the cryptography chip, that one or more requests to perform cryptographic operations are malicious based on the requests not including client identity information associated with any one of the clients that are permitted to request cryptographic operations; and
   in response to determining that the one or more requests to perform cryptographic operations are malicious, clearing, by the cryptography chip, the encrypted identity information and the key information from the storage resource.

8. The computer-implemented method of claim 1, wherein the cryptography chip is a field-programmable gate array (FPGA), and the method further comprising:
receiving, by the cryptography chip, a request to reprogram the cryptography chip including reprogramming information; and
in response to receiving the request, replacing, by the cryptography chip, information stored in the storage resource with the reprogramming information.

9. The computer-implemented method of claim 1, wherein the client identity information comprises biometric information associated with the client.

10. The computer-implemented method of claim 9, wherein the client identity information is received from a biometric device included in the cryptography chip.

11. The computer-implemented method of claim 1, wherein the key included in the software instructions is encrypted, and wherein decrypting, by the cryptography chip, the encrypted identity information comprises:
decrypting the encrypted key included in the software instructions.

12. The computer-implemented method of claim 1, wherein the storage resource stores program logic executable by the processing resource to perform the requested cryptographic operation, and
wherein the program logic is stored unencrypted.

13. The computer-implemented method of claim 1, wherein the cryptography chip includes a physical interface, and wherein receiving the request to perform the requested cryptographic operation comprises:
receiving a selection of a desired cryptographic operation through the interface from the client.

14. The computer-implemented method of claim 13, wherein the client is a user, and wherein receiving the selection of the desired cryptographic operation comprises receiving an input by the user through the physical interface.

15. A non-transitory, computer-readable storage medium storing one or more instructions executable by a computer system to perform operations comprising:
receiving, by a cryptography chip, a request to perform a requested cryptographic operation from a client, wherein the request includes client identity information associated with the client, and wherein the cryptography chip is a hardware component including a processing resource that performs cryptographic operations and a storage resource that stores key information used in the cryptographic operations and encrypted identity information associated with clients that are permitted to request cryptographic operations;
decrypting, by the cryptography chip, the encrypted identity information using a key included in software instructions stored in a firmware of the cryptography chip;
determining, by the cryptography chip, that the client identity information is associated with one of the clients that are permitted to request cryptographic operations based on comparing the client identity information to the decrypted identity information; and
in response to determining that the client identity information is associated with one of the clients that are permitted to request cryptographic operations, performing, by the cryptography chip, the requested cryptographic operation based on the key information stored in the storage resource.

16. The non-transitory, computer-readable storage medium of claim 15, wherein the requested cryptographic operation is an encryption operation, a decryption operation, a digital signature verification operation, or a digital signature generation operation.

17. The non-transitory, computer-readable storage medium of claim 15, wherein the cryptography chip is a field-programmable gate array (FPGA), an application specific integrated circuit (ASIC), or a microprocessor.

18. The non-transitory, computer-readable storage medium of claim 15, wherein the request includes data, and wherein the cryptography chip performs the requested cryptographic operation on the data.

19. The non-transitory, computer-readable storage medium of claim 15, wherein the cryptography chip includes an operating system executed by the processing resource to operate a computer system in which the cryptography chip is included.

20. The non-transitory, computer-readable storage medium of claim 15, wherein the request is a first request, the requested cryptographic operation is a first requested cryptographic operation, the client identity information is first client identity information, and the operations further comprise:
receiving a second request to perform a second requested cryptographic operation from a second client, wherein the second request includes second client identity information associated with the second client; and
determining that the second client identity information is not associated with one of the clients that are permitted to request cryptographic operations based on comparing the second client identity information to the decrypted identity information,
wherein, in response to determining that the second client identity information is not associated with one of the clients that are permitted to request cryptographic operations not performing the second requested cryptographic operation.

21. The non-transitory, computer-readable storage medium of claim 15, wherein the operations further comprise:
determining that one or more requests to perform cryptographic operations are malicious based on the requests not including client identity information associated with any one of the clients that are permitted to request cryptographic operations; and
in response to determining that the one or more requests to perform cryptographic operations are malicious, clearing, the encrypted identity information and the key information from the storage resource.

22. The non-transitory, computer-readable storage medium of claim 15, wherein the storage medium comprises a cryptography chip programmed on a field-programmable gate array (FPGA), and the operations further comprise:
receiving, by the cryptography chip, a request to reprogram the cryptography chip including reprogramming information; and
in response to receiving the request, replacing, by the cryptography chip, information stored in the storage resource with the reprogramming information.

23. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving, by a cryptography chip, a request to perform a requested cryptographic operation from a client, wherein the request includes client identity information associated with the client, and wherein the cryptography chip is a hardware component including a processing resource that performs cryptographic operations and a storage resource that stores key information used in the cryptographic operations and encrypted identity information associated with clients that are permitted to request cryptographic operations;

decrypting, by the cryptography chip, the encrypted identity information using a key included in software instructions stored in a firmware of the cryptography chip;

determining, by the cryptography chip, that the client identity information is associated with one of the clients that are permitted to request cryptographic operations based on comparing the client identity information to the decrypted identity information; and in response to determining that the client identity information is associated with one of the clients that are permitted to request cryptographic operations, performing, by the cryptography chip, the requested cryptographic operation based on the key information stored in the storage resource.

24. The system of claim 23, wherein the requested cryptographic operation is an encryption operation, a decryption operation, a digital signature verification operation, or a digital signature generation operation.

25. The system of claim 23, wherein the cryptography chip is a field-programmable gate array (FPGA), an application specific integrated circuit (ASIC), or a microprocessor.

26. The system of claim 23, wherein the request includes data, and wherein the cryptography chip performs the requested cryptographic operation on the data.

27. The system of claim 23, wherein the cryptography chip includes an operating system executed by the processing resource to operate a computer system in which the cryptography chip is included.

28. The system of claim 23, wherein the request is a first request, the requested cryptographic operation is a first requested cryptographic operation, the client identity information is first client identity information, and wherein the operations further comprise:

receiving a second request to perform a second requested cryptographic operation from a second client, wherein the second request includes second client identity information associated with the second client; and determining that the second client identity information is not associated with one of the clients that are permitted to request cryptographic operations based on comparing the second client identity information to the decrypted identity information, wherein, in response to determining that the second client identity information is not associated with one of the clients that are permitted to request cryptographic operations, not performing the second requested cryptographic operation.

29. The system of claim 23, wherein the operations further comprise:

determining that one or more requests to perform cryptographic operations are malicious based on the requests not including client identity information associated with any one of the clients that are permitted to request cryptographic operations; and in response to determining that the one or more requests to perform cryptographic operations are malicious, clearing the encrypted identity information and the key information from the storage resource.

30. The system of claim 23 comprising a cryptography chip programmed on a field-programmable gate array (FPGA), and wherein the operations further comprise:

receiving, by the cryptography chip, a request to reprogram the cryptography chip including reprogramming information; and in response to receiving the request, replacing, by the cryptography chip, information stored in the storage resource with the reprogramming information.

* * * * *